US010018175B2

(12) United States Patent
Marcoe et al.

(10) Patent No.: US 10,018,175 B2
(45) Date of Patent: Jul. 10, 2018

(54) INDUCTION CONSOLIDATION FOR WIND BLADE FABRICATION

(71) Applicant: The Boeing Company, Chicago, IL (US)

(72) Inventors: Jeffery Lee Marcoe, Bellevue, WA (US); Marc Rollo Matsen, Seattle, WA (US); Mark Alan Negley, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 317 days.

(21) Appl. No.: 14/873,684

(22) Filed: Oct. 2, 2015

(65) Prior Publication Data

US 2016/0195062 A1    Jul. 7, 2016

Related U.S. Application Data

(60) Provisional application No. 62/176,903, filed on Jan. 5, 2015.

(51) Int. Cl.
| | |
|---|---|
| *F03D 1/06* | (2006.01) |
| *B29C 35/08* | (2006.01) |
| *B29D 99/00* | (2010.01) |
| *B29C 70/44* | (2006.01) |

(Continued)

(52) U.S. Cl.
CPC ........ *F03D 1/0675* (2013.01); *B29C 35/0805* (2013.01); *B29C 64/129* (2017.08); *B29C 70/446* (2013.01); *B29D 99/0028* (2013.01); *B29C 2035/0811* (2013.01);
(Continued)

(58) Field of Classification Search
CPC ... F03D 1/0675; B29C 64/129; B29C 70/446; B29C 35/0805; B29C 2035/0811; B29D 99/0028; B29L 2031/08
See application file for complete search history.

(56) References Cited

U.S. PATENT DOCUMENTS

| | | | |
|---|---|---|---|
| 4,264,278 A * | 4/1981 | Weingart | ............... B29C 53/66 156/189 |
| 4,273,601 A * | 6/1981 | Weingart | ............. B29C 53/582 156/184 |
| 5,128,192 A | 7/1992 | Narasaki | |

(Continued)

FOREIGN PATENT DOCUMENTS

| | | |
|---|---|---|
| EP | 2796265 A1 | 10/2014 |
| JP | 201198514 A | 5/2011 |

OTHER PUBLICATIONS

Machine Translation of JP2011098514, Generated 2017.*

(Continued)

*Primary Examiner* — Eldon Brockman
(74) *Attorney, Agent, or Firm* — McDonnell Boehnen Hulbert & Berghoff LLP

(57) ABSTRACT

A method of fabricating a thermoplastic composite tubular structure for use as a wind turbine blade is presented using a combination of induction heating with smart susceptors to consolidate a wrapped mandrel. The method can include overbraiding the mandrel with a continuous fiber thermoplastic composite material to form an overbraided mandrel that is then installed in a ceramic induction oven where the mandrel is pressurized internally to consolidate the thermoplastic overbraid during heating.

14 Claims, 3 Drawing Sheets

(51) Int. Cl.
  *B29C 64/129* (2017.01)
  *B29L 31/08* (2006.01)
(52) U.S. Cl.
  CPC ......... *B29L 2031/08* (2013.01); *Y02E 10/721* (2013.01); *Y02P 70/523* (2015.11)

(56) References Cited

U.S. PATENT DOCUMENTS

| | | | | |
|---|---|---|---|---|
| 5,439,215 | A * | 8/1995 | Ratchford | B29C 53/8016 473/561 |
| 5,530,227 | A * | 6/1996 | Matsen | B21D 26/021 219/603 |
| 5,591,369 | A * | 1/1997 | Matsen | B21D 26/021 219/603 |
| 5,645,744 | A * | 7/1997 | Matsen | B21D 26/021 219/618 |
| 5,710,414 | A * | 1/1998 | Matsen | B21D 26/021 219/633 |
| 5,728,309 | A * | 3/1998 | Matsen | B21D 26/021 219/633 |
| 5,808,281 | A * | 9/1998 | Matsen | B21D 26/021 219/615 |
| 6,180,932 | B1 * | 1/2001 | Matsen | B23K 1/002 219/615 |
| 6,528,771 | B1 * | 3/2003 | Matsen | H05B 6/06 219/634 |
| 8,734,703 | B2 * | 5/2014 | Havens | B29C 33/485 264/313 |
| 2005/0035115 | A1 | 2/2005 | Anderson et al. | |
| 2010/0065552 | A1 | 3/2010 | Matsen et al. | |
| 2012/0288655 | A1 * | 11/2012 | Havens | B29C 33/485 428/36.9 |
| 2013/0101430 | A1 * | 4/2013 | Waas | F03D 1/0683 416/230 |
| 2014/0102578 | A1 | 4/2014 | Bartel et al. | |

OTHER PUBLICATIONS

Extended European Search Report issued in European Patent Application No. 15196773.4 dated May 10, 2016.
English Machine Translation of Japanese Patent Application No. 2011-098514 dated Apr. 21, 2016.
Pending U.S. Appl. No. 13/937,253, filed Jul. 9, 2013.

* cited by examiner

INDUCTION CONSOLIDATION FOR WIND BLADE FABRICATION

CROSS REFERENCE TO RELATED APPLICATIONS

The present application claims the benefit of Provisional Application No. 62/176,903, filed Jan. 5, 2015, which is herewith incorporated by reference into the present application.

TECHNICAL FIELD

This disclosure generally relates to systems and processes for forming a wind turbine blade composed of a thermoplastic material and using induction heating to consolidate the thermoplastic material.

BACKGROUND

Formed composite parts are commonly used in applications, such as aircraft and vehicles, where lightweight and high strength are desired. Thermoplastic and fiber-reinforced thermoplastic composite structures and parts are used in a wide variety of applications, including in the manufacture of aircraft, space craft, rotorcraft, watercraft, automobiles, trucks, and other vehicles and structures, due to their high strength-to-weight ratios, corrosion resistance, and other favorable properties. In aircraft manufacturing and assembly, such thermoplastic and fiber-reinforced thermoplastic composite structures and parts are used in increasing quantities to form the fuselage, wings, tail section, skin panels, and other components. However, the use of thermoplastic composite materials in the design and manufacture of tubular cylindrical and non-cylindrical structures, such as tubes, pipes, ducts, conduits, and elongate hollow components, for use in aircraft or other applications, may be difficult due to tooling removal, the size of the part, processing temperature, outer surface dimensional tolerances, fiber alignment, and other processing challenges.

Although known methods exist for fabricating tubular cylindrical and non-cylindrical structures from thermoset composite materials and from aluminum and titanium metal materials, there are certain drawbacks to using these materials. For example, the use of thermoset composite materials may require long cure cycles, e.g., 4 hours to 24 hours or more, due to the crosslinking that the thermoset composite materials undergo, and longer cure cycles may result in increased manufacturing time, and in turn, increased manufacturing costs. The use of metal materials may result in an overall increased weight of the aircraft or other mechanism using the finished part, which, in turn, may result in increased fuel and operational costs, especially during aircraft flight. Moreover, the use of titanium metal materials may result in increased manufacturing costs due to the high cost of such titanium metal materials. Accordingly, the use of thermoplastics provides a desirable, less costly alternative for use in the fabrication of components that are used in the manufacture of a variety apparatus that need strong lightweight components.

One such apparatus that benefits from strong lightweight components is a wind turbine. Wind turbines have become an important source of energy in recent years. To increase the efficiency of the wind turbine many wind turbines are designed to be several hundred feet in height and may have blades that are over one hundred feet in length. As a result, facilities utilized to fabricate wind turbines, and especially wind turbine blades are relatively large. To a large extent the size of these facilities is driven by both the actual size of the finished wind turbine blade and also the long cycle time associated with the manufacture of the blade when fabricated from composite materials. These long cycle times are a direct result of both the lay-up and curing of the wind blade. More specifically, the length of time currently required to lay-up and cure a conventional wind turbine blade is significant. Thus, to meet current demands for wind turbines, manufacturers have been increasing the size of the production facilities to enable more blades to be fabricated concurrently. However, rather than building larger production facilities, it would be desirable to reduce the time required to fabricate a wind turbine blade, such that an increased quantity of turbine blades may be manufactured without enlarging the production facility.

Accordingly, there is a need for fabricating wind turbine blades using thermoplastic materials that provide advantages over known structures and methods.

SUMMARY

This need for improved thermoplastic composite tubular structures in the fabrication of wind turbine blades and improved methods for fabricating these blades is satisfied by the teaching presented in this disclosure. As discussed in the below detailed description, embodiments of the improved thermoplastic wind turbine blade composite structures and improved methods for fabricating such blades may provide significant advantages over existing structures and methods.

In an embodiment of the disclosure, there is provided a method of fabricating a wind turbine blade that includes wrapping a mandrel with a thermoplastic material and consolidating the thermoplastic material using at least one susceptor sheet. The method can also include positioning the wrapped mandrel into a ceramic mold and pressurizing an internal portion of the mandrel such that the wrapped mandrel is pressed against an interior surface of the ceramic mold. Energizing an induction coil adjacent the susceptor sheet can consolidate the thermoplastic material. Preferably, the mandrel is an aluminum mandrel and can contain a plurality of individually inflatable mandrel portions where each mandrel portion is separately inflatable such that the thermoplastic material is pressed against an interior surface of a ceramic mold. Overbraiding using a braiding apparatus can perform the wrapping of the mandrel with the thermoplastic material.

Another embodiment is a system for forming a wind turbine blade that includes an inflatable metal mandrel configured in the shape of a portion or a complete wind turbine blade, a braiding machine configured to wrap the mandrel with a thermoplastic material, a ceramic tool with an integral induction coil, and at least one sheet of susceptor material lining an internal portion of the ceramic tool.

Yet another possible embodiment includes a wind turbine blade fabricated of braided and consolidated thermoplastic, where the thermoplastic material is overbraided onto an inflatable metal mandrel and consolidated in an induction processing system using one or more susceptor sheets incorporated into a ceramic mold.

The features, functions, and advantages that have been discussed can be achieved independently in various embodiments or may be combined in yet other embodiments, the further details of which can be seen with reference to the following description and drawings.

BRIEF DESCRIPTION OF THE FIGURES

The present disclosure will become more fully understood from the more detailed description presented below and the accompanying drawings which are presented by way of illustration only, and thus, are not limitations of the present disclosure, and wherein.

Corresponding parts are marked with the same reference symbols in all figures.

DETAILED DESCRIPTION

Disclosed embodiments will now be described more fully below with reference to the accompanying drawings, in which some, but not all of the disclosed embodiments are shown. Indeed, several different embodiments may be provided and should not be construed as limited to the embodiments set forth in this disclosure. Rather, these embodiments are provided so that this disclosure will be thorough and complete and will fully convey the scope of the disclosure to those skilled in the art.

Figure 1:
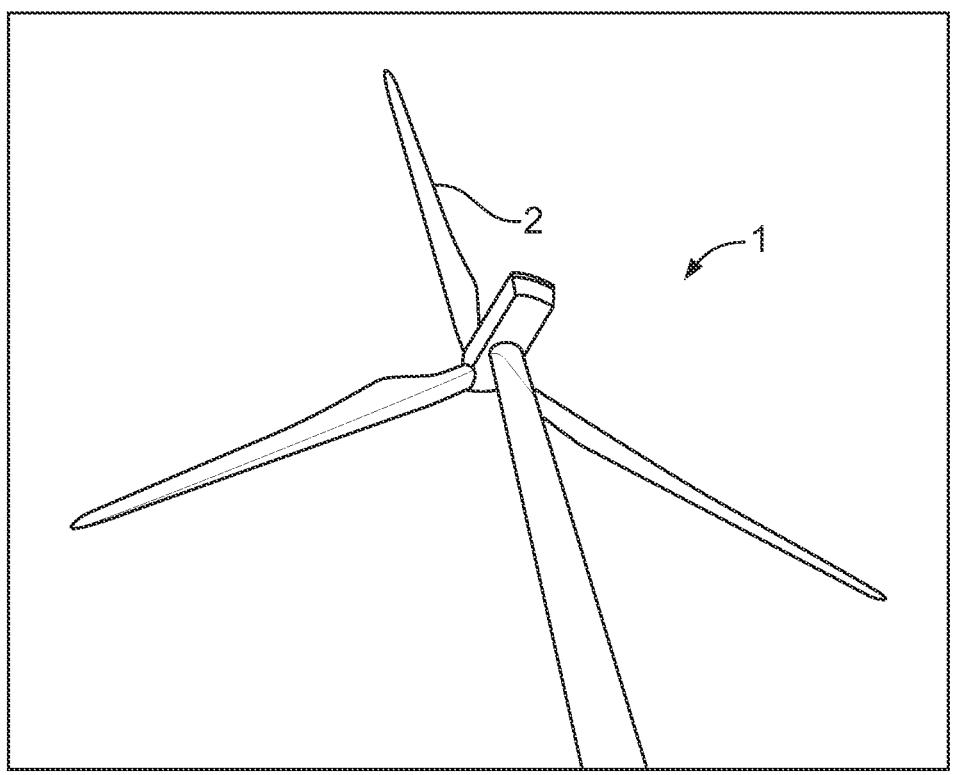
FIG. 1 is a perspective view of one example of a wind turbine having three turbine blades.
Figure 2:
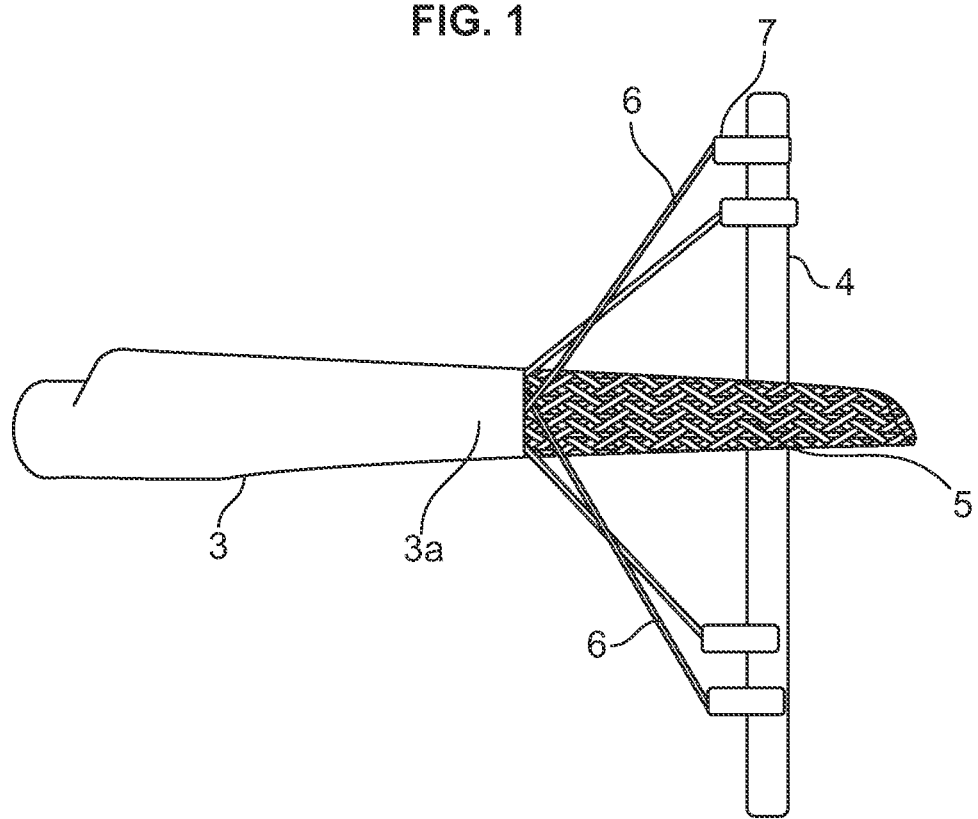
FIG. 2 is a schematic view of an overbraiding process wrapping a mandrel in the shape of a wind turbine blade with thermoplastic material.

FIG. 1 shows a typical wind turbine 1 having three turbine blades 2. The turbine blades 2 can be fabricated according to the manufacturing methods described in this disclosure, for example, using an overbraiding process as schematically illustrated in FIG. 2. Braiding machine 4 wraps a plurality of thermoplastic tapes or tows 6 around a tubular mandrel 3 that is configured in the shape of turbine blade 2. The thermoplastic tapes 6 are continuous fiber thermoplastic composite materials delivered from a number of spools or bobbins 7 in the braiding machine 4 to cover the exterior surface 3a of mandrel 3 with overbraided thermoplastic 5 that conforms to the shape of mandrel 3.

The mandrel 3 can be made of a number of materials or combination of materials, however, a preferred material is metal. Desirable characteristics for a metallic mandrel is one that can be formed into an expandable or inflatable bladder with the ability to hold pressure, thermal stability, flexibility, conformity and thermal expansion characteristics. For example, it may be desirable for the material of the metallic bladder to be thermally stable at consolidation temperatures for the structure being fabricated. During consolidation, metallic bladder may be pressurized such that metallic bladder imparts an outward directed compressive force against the overbraided thermoplastic 5. One preferred metal that can be used is aluminum or an aluminum alloy. Alternatively, the mandrel 3 could be fabricated from magnesium or a magnesium alloy. Metallic mandrels are preferred because of their conduction properties and ability to withstand the temperatures required during consolidation of the thermoplastic overbraid 5.

The continuous fiber thermoplastic composite material 6 preferably consists of carbon fiber composite material; carbon fiber reinforced polymer material including carbon fiber reinforced polypheylene sulfide (PPS), carbon fiber reinforced polyetheretherketone (PEEK), carbon fiber reinforced polyetherketoneketone (PEKK), and carbon fiber reinforced polyethyleneimine (PEI); nylon, or another suitable thermoplastic composite material. As mentioned, the continuous fiber thermoplastic composite material 6 is preferably in a form consisting of a continuous slit tape thermoplastic composite material, a commingled fiber material, a quasi-isotropic or anisotropic continuous fiber thermoplastic composite material, or another suitable continuous fiber thermoplastic composite material. Preferably, the continuous fiber thermoplastic composite material 6, such as in the form of the unidirectional tape or tow, has a narrow width of ⅛ inch wide, ¼ inch wide, or another suitable width tape up to 4" wide. The tows do not have to be the same width, for example, the axial tows and the bias tows can be different widths for covering the mandrel and for structural mechanical performance. Using continuous fiber thermoplastic composite materials in the form of a unidirectional tape or tow, can have widths greater than ⅛ inch wide, which allow for faster braiding machine material lay down rates. The commingled fiber material may comprise dry fibers with a thermoplastic resin powder embedded in the dry fibers. The continuous fiber thermoplastic composite material 6 may be wound and/or braided around the mandrel 3 in a zero (0) degree direction and also wound or braided in a bias direction. When the continuous fiber thermoplastic composite material 6 is wound or braided in a bias direction, the commingled fiber material may be used so that when the continuous fiber thermoplastic composite material 6 is heated and consolidated, the embedded resin powder fills the dry fibers and melts to result in the consolidated finished thermoplastic composite tubular wind turbine blade structure 10 (see FIG. 6).

For purposes of this application, "quasi-isotropic continuous fiber thermoplastic composite material" means a laminate that approximates isotropy by orientation of tows in several or more directions in-plane. For example, a quasi-isotropic part may have randomly oriented fibers in all directions or may have fibers oriented such that equal strength is developed all around the plane of the part. In general, a quasi-isotropic laminate made from a prepreg fabric or woven fabric may have tows oriented at 0° (zero degrees), 90°, +45°, and −45°, with approximately 25% of the tows in each of these four directions. Quasi-isotropic properties may also be obtained with braided unidirectional (0 degree) and 60 degree bias oriented tows. For purposes of this application, "anisotropic continuous fiber thermoplastic composite material" means the composite material's directional dependence of a physical property and can be a difference, when measured along different axes, in a material's physical or mechanical properties (absorbance, refractive index, conductivity, tensile strength, etc.). Anisotropic may also be referred to as "unidirectional". The methods of this disclosure provide for fabricating and configuration of highly loaded quasi-isotropic or highly loaded anisotropic (unidirectional) thermoplastic composite continuous fiber wind turbine blades manufactured with the use of expandable or inflatable metal mandrels or tooling materials.

FIG. 2 provides a schematic illustration a braiding apparatus 4 for overbraiding the one example of the possible mandrels that may be used in method embodiments of this disclosure. The overbraiding of the mandrel 3 is preferably accomplished by using the braiding apparatus 4 having one or more braiding bobbins or tubes 7 for dispensing and braiding the continuous fiber thermoplastic composite material 6 over the mandrel 3. A braiding apparatus or machine known in the art may be used to overbraid the mandrel. Preferably, the known braiding apparatus or machine has the capability of accommodating changes and variations of the mandrel exterior surface 3a and varying the braided fiber thermoplastic composite 5 thickness, gauge, bias angle along the length, cross-sectional shape, cross-sectional angular path along the length, curve, shape of drop, and number of tows. Preferably, the overbraiding of the mandrel 3 is carried out at ambient temperature. The overbraiding process preferably provides for improved damage tolerance and improved fracture toughness properties of the continuous fiber thermoplastic composite material 6 due to the over and under construction of the overbraiding process. Any number of braiding techniques and patterns as known to those skilled in the art may be used. In some circumstances it may be beneficial to use a laser to assist in the placement of the thermoplastic material during the overbraiding process. The laser equipment could also be used to tack portions of the thermoplastic composite material 6 as the overbraiding process is performed to substantially maintain the position of select tows relative to the other tows.

Figure 3:
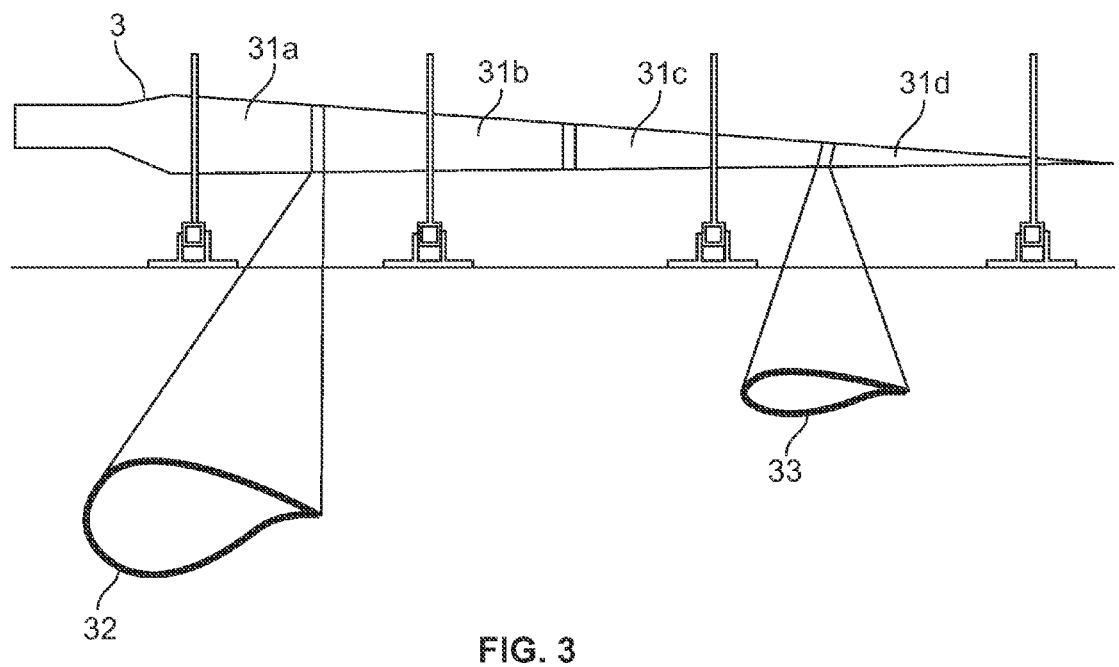
FIG. 3 is a schematic representation of a segmented mandrel.
Figure 6:
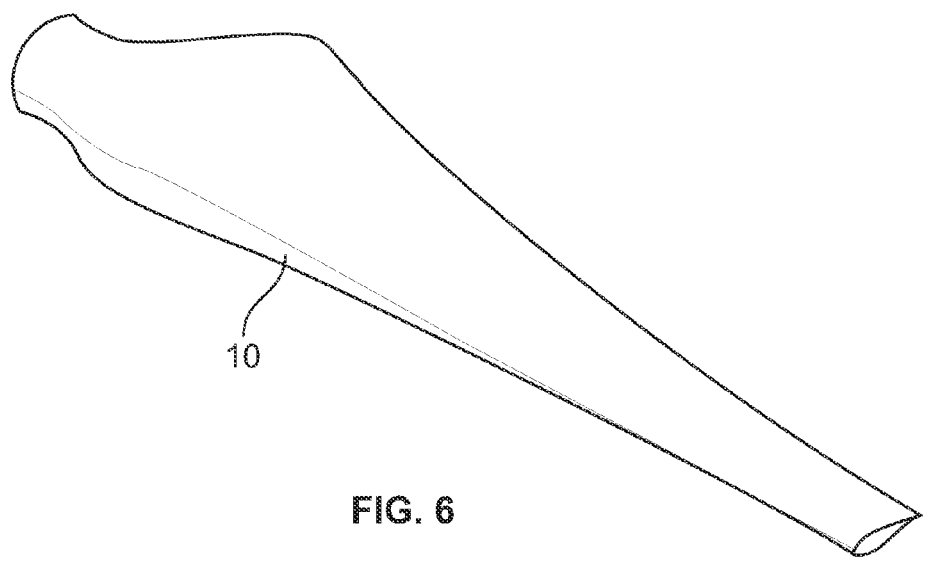
FIG. 6 is the finished wind turbine blade fabricated using the process and equipment shown in FIGS. 2-4.

The overbraided mandrel 8 preferably has an overbraided mandrel cross-section 8a (see FIG. 4) defining either the entire wind turbine blade 2 or a linear section of the blade. Preferably, the overbraided mandrel cross-section 8a corresponds in shape to the desired turbine blade 2. A variation in the manufacturing method of this disclosure is possible where a segmented mandrel 3 is used as schematically illustrated in FIG. 3. In the particular segmented mandrel shown in FIG. 3, the mandrel 3 comprises 4 segments 31a-31d, each having its own cross-sectional profile, as exemplified by the two cross-sectional profiles 32 and 33. Each of mandrels portions 31a-31d can be individually wrapped with thermoplastic material and consolidated. Likewise, each portion can be inflated using a single or multiple bladder configurations. Once a finished tubular section is finished, the sections can be joined together to form a completed turbine blade 10 as shown in FIG. 6. Using segmented mandrels/bladders can make it easier to remove the mandrel/bladder from the braided fiber thermoplastic composite 5 sections.

Figure 4:
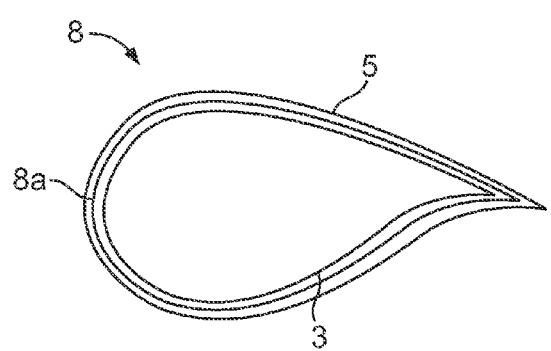
FIG. 4 is a cross-sectional view of a wrapped mandrel obtained from the overbraiding procedure illustrated in FIG. 2.
Figure 5:
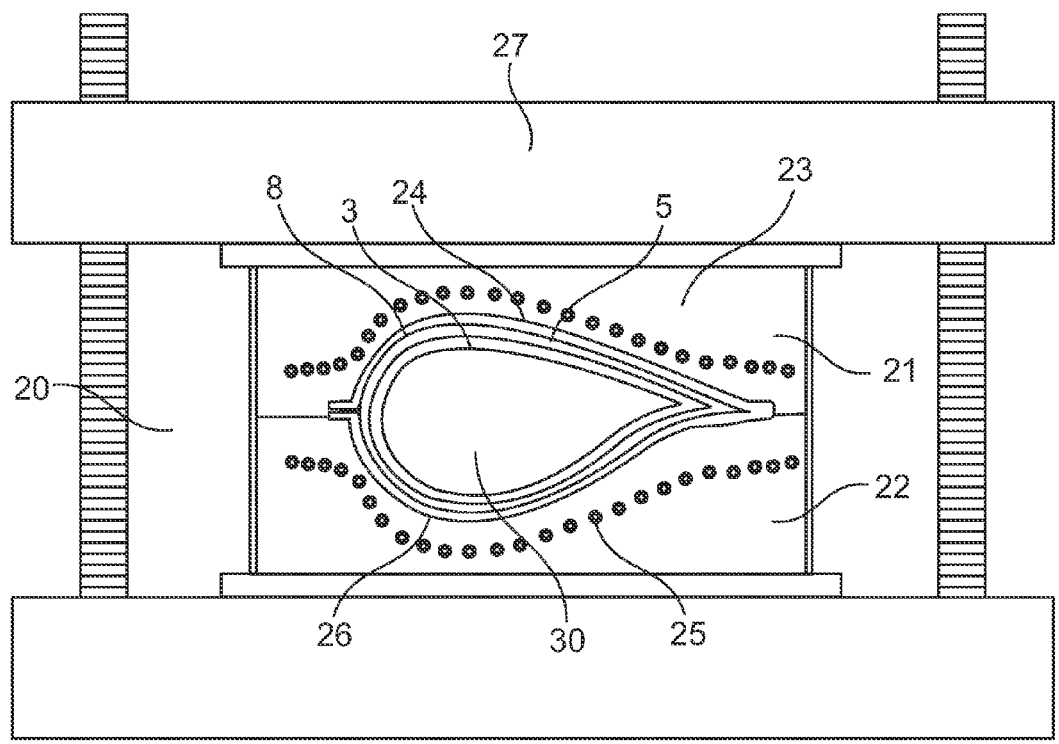
FIG. 5 is a cross-sectional view of the wrapped mandrel from FIG. 4 placed in a ceramic induction tool to consolidate the braided thermoplastic using susceptor sheets.

Once the mandrel 3 is completely overbraided the method, as shown in FIG. 4, further comprises the step of installing the overbraided mandrel 8 into a matched tooling assembly 20 (see FIG. 5). FIG. 5 is an illustration of a cross-sectional view taken along the approximate midsection of the wind turbine blade mandrel 3 showing the overbraided mandrel 8 installed in the matched tooling assembly 20. The matched tooling assembly 20 preferably comprises a ceramic clamshell tooling assembly comprising a first portion mold side 21 and a second portion mold side 22. The overbraided mandrel 8 may be installed within and between the first portion mold side 21 and the second portion mold side 22. As shown in FIG. 5, once the matched tooling assembly 20 is closed around the overbraided mandrel 8, the first portion 21 and the second portion 22 of the matched tooling assembly 20 may be held together via a holding element 27, such as a clamp or other suitable device.

The tooling assembly 20 further includes the necessary mechanical and electrical components to consolidate the installed overbraided mandrel 8 at a specified heating profile in order to consolidate the continuous fiber thermoplastic composite material 5 and form a thermoplastic composite tubular structure 10. FIG. 5 is an illustration of a cut-away perspective view of the overbraided mandrel 8 installed in the matched tooling assembly 20 that includes an induction coil 25 that when energized will cause susceptor sheets 24 and 26 to emit heat that consolidates the continuous fiber thermoplastic composite material 5 overbraided onto mandrel 3. The ceramic mold 23 of the tooling assembly 20 can be a unitary structure having an opening defined there through that is sized to receive the mandrel. Optionally, the ceramic oven may be formed from two or molded pieces of ceramic 21 and 22, that when combined, formed the opening described above. As mentioned, the ceramic mold includes at least one induction coil 25 formed therein. In operation, the induction coil is energized to generate a magnetic field within the ceramic mold. Ceramic is a preferred mold material because of its transparency to magnetic fields.

The oven further includes at least one smart susceptor liner or sheet 24, 26 that is arranged to at least partially encapsulate the mandrel wrapped with the thermoplastic material. In operation, the smart susceptor liner accepts energy from the integrally cast induction coil 25 and heats rapidly to the desire consolidation temperature required to consolidate the thermoplastic. Smart susceptor 24, 26 can comprise a material configured to generate heat when exposed to a magnetic field created by one or more induction coils 25. Susceptor material may be selected from a metal, a metal alloy, a ceramic, a metalized film, or any other suitable material. In some illustrative examples, the material comprises a metallic alloy having ferromagnetic properties. In some illustrative examples, a ferromagnetic material may be selected based on a desired consolidation temperature. For example, the susceptor material may be selected based on a temperature at which a ferromagnetic material becomes non-magnetic. This temperature is also known as a Curie temperature. A ferromagnetic material may be selected such that the Curie temperature for the ferromagnetic material corresponds to a desired consolidation temperature. In these illustrative examples, the smart susceptors 24, 26 may be selected from alloy 510, Invar, Kovar, Moly Permalloy, or any other suitable material that generates heat when exposed to a magnetic field. Alloy 510 may also be known as Phosphor Bronze.

Preferably, the specified heating profile comprises a heating temperature in a range of from about 150° F. to about 800° F. More preferably, the heating temperature is in a range of from about 400° F. to about 750° F. Most preferably, the heating temperature is in a range of from about 550° F. to about 700° F. Preferably, the specified heating profile comprises a heating time in a range of from about 20 minutes to about 240 minutes. More preferably, the heating time is in a range of from about 30 minutes to about 120 minutes.

During heating using the combination of the induction coil 25 and the susceptor sheets 24 and 26, an internal portion 30 of the mandrel 3 is pressurized to expand the mandrel to exert pressure on the continuous fiber thermoplastic composite material 5 against the matched tooling assembly 20 causing consolidation or hardening of the continuous fiber thermoplastic composite material 5 to form the thermoplastic composite tubular blade structure 10. The pressure is generated using pressurized air or another source of pressurized gas, including inert gas, such as nitrogen or helium. As used herein, the terms "consolidate" or "consolidation" means hardening or toughening of the thermoplastic composite material under heat and/or pressure to form a unitary structure and cooling of the hardened or toughened unitary structure, e.g., the thermoplastic composite tubular wind turbine blade 10. During consolidation, the heat and/or pressure causes a flow of the resin/polymeric material and wetting of reinforcing fibers of the thermoplastic composite material.

Preferably, the pressure exerted by the mandrel on the continuous fiber thermoplastic composite material 5 may be in a range of from about 100 psi to about 400 psi, most preferably in the range of from about 100 to about 150 psi. In addition, by providing a ceramic clamshell tooling assembly 20 with smooth, polished surfaces defined by the susceptor sheets 24 and 26 the pressure exerted by the expandable, inflatable mandrel 3 is generated from the inside out, such that, any wrinkles or deformations on the outside of the consolidated or hardened formed thermoplastic composite tubular structure 10 may be avoided or minimized. In one embodiment, the mandrel is an inflatable bladder having a single interior cavity. Optionally, as mentioned, the bladder could be formed to include several separate cavities that may be filled at different pressures if desired. These separate bladders are contained within the single mandrel. Additionally, the mandrel may be formed from several mandrel portions, each portion having a single or multiple inflatable bladder sections. When several mandrels are used the combination of them has the sufficient length, width, etc. to consolidate a single wind turbine blade. For example, for a 60 foot blade, two 30 foot mandrels/bladders could be used. For a 90 foot blade, three 30 foot mandrel/bladders could be used.

The method of fabricating the wind turbine blade 10 may further include a cooling step where the matched tooling assembly 20 with the formed thermoplastic composite tubular structure 10 is cooled at a specified cooling profile that is based on the particular resins used. As such, a wide variety of cooling rates can be used based on the low thermal mass and the capability to produce gas flow through the internal pressurized metallic bladder. The specified cooling profile preferably comprises a temperature below a glass transition temperature of the continuous fiber thermoplastic composite material 5. The inflatable mandrel 3 is maintained at pressure and after a predetermined quantity of time within the tooling assembly 20, the cooled consolidated wind turbine blade is removed, trimmed, and inspected. One advantage of the system described above, is that the completed wind turbine blade does not have any seam lines.

The foregoing description of the specific embodiments will reveal the general nature of the disclosure so others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The invention claimed is:

1. A method of manufacturing a wind turbine blade, the method comprising:
   wrapping an exterior surface of a mandrel with a thermoplastic material; and
   consolidating the thermoplastic material using at least one susceptor sheet,
   wherein the mandrel is a segmented mandrel comprising a plurality of mandrel segments, each mandrel segment of the plurality of mandrel segments having its own cross-sectional profile, and
   wherein each mandrel segment of the plurality of mandrel segments is individually wrapped with the thermoplastic material and consolidated.

2. The method of claim 1, further comprising:
   positioning the wrapped mandrel into a ceramic mold; and
   pressurizing an internal portion of the mandrel such that the wrapped mandrel is pressed against an interior surface of the ceramic mold.

3. The method of claim 2, wherein pressurizing the internal portion of the mandrel involves inflating one or more bladders located within the mandrel segments of the plurality of mandrel segments using a pressurized gas.

4. The method of claim 1 where consolidating of the thermoplastic material is performed by energizing an induction coil adjacent the susceptor sheet.

5. The method of claim 1, wherein the mandrel comprises an aluminum mandrel.

6. The method of claim 5, further comprising:
   positioning the wrapped mandrel into a ceramic mold; and
   pressurizing an internal portion of the aluminum mandrel such that the thermoplastic material is pressed against an interior surface of the ceramic mold.

7. The method of claim 1, wherein each mandrel segment of the plurality of mandrel segments comprises a single or multiple bladder configuration, the method further comprising inflating the bladders such that the thermoplastic material is pressed against an interior surface of a ceramic mold.

8. The method of claim 1, further comprising consolidating the thermoplastic material using two susceptor sheets to form a single unitary wind turbine blade.

9. The method of claim 1 where the wrapping comprises overbraiding using a braiding machine.

10. The method of claim 1 further characterized in that the wrapping of the thermoplastic comprises using a continuous fiber composite material that is a unidirectional tape or tow.

11. The method of claim 10 further characterized in that the wrapping comprises using axial tows and bias tows, where the bias tows have a width different than the axial tows.

12. The method of claim 1, further comprising joining the individually wrapped mandrel segments together to form a completed wind turbine blade.

13. A system for forming a wind turbine blade comprising:
   an inflatable metal mandrel having an exterior surface and configured in the shape of a portion or a complete wind turbine blade, the mandrel being a segment mandrel comprising a plurality of mandrel segments, each mandrel segment of the plurality of mandrel segments having its own cross-sectional profile;
   a braiding machine configured to wrap the exterior surface of the mandrel with a thermoplastic material;
   a ceramic tool with an integral induction coil; and
   at least one sheet of susceptor material lining an internal portion of the ceramic tool.

14. The system of claim 13 where the inflatable mandrel comprises one or more inflatable bladders.

* * * * *